(12) United States Patent
Hochi

(10) Patent No.: US 7,222,652 B2
(45) Date of Patent: May 29, 2007

(54) SIDE-REINFORCING RUBBER COMPOSITION AND RUN FLAT TIRE USING THE SAME

(75) Inventor: Kazuo Hochi, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/019,194

(22) Filed: Dec. 23, 2004

(65) Prior Publication Data

US 2005/0182178 A1    Aug. 18, 2005

(30) Foreign Application Priority Data

Feb. 17, 2004   (JP) .............................. 2004-039834

(51) Int. Cl.
B60C 17/00 (2006.01)
B60C 17/04 (2006.01)
B60C 1/00 (2006.01)

(52) U.S. Cl. ........................................ 152/516; 152/517

(58) Field of Classification Search ............... None
See application file for complete search history.

(56) References Cited

U.S. PATENT DOCUMENTS

| 6,196,289 B1 * | 3/2001 | Yoshioka ............ 152/517 |
| 6,699,921 B2 * | 3/2004 | Ikeda ................ 524/236 |
| 6,759,456 B2 * | 7/2004 | Kikuchi .............. 524/81 |

2001/0051685 A1   12/2001   Obrecht et al.

FOREIGN PATENT DOCUMENTS

| EP | 0 586 727 A1 | 3/1994 |
| JP | 63-301245 A | 12/1988 |
| JP | 08-067776 A | 3/1996 |
| JP | 11-140234 A | 5/1999 |
| JP | 11-348513 A | 12/1999 |
| JP | 2000-016028 A | 1/2000 |
| JP | 2002-88191 | * 3/2002 |
| JP | 2002-155169 | * 5/2002 |
| JP | 2002-155169 A | 5/2002 |
| JP | 2003-292685 A | 10/2003 |
| JP | 2004-027003 A | 1/2004 |
| KR | 100142403 | 3/1998 |

* cited by examiner

Primary Examiner—Justin R. Fischer
(74) Attorney, Agent, or Firm—Birch, Stewart, Kolasch & Birch, LLP

(57) ABSTRACT

A side-reinforcing rubber composition for a run flat tire, which achieves both low heat generating properties and high strength and improves run flat durability, and a run flat tire which uses such a rubber composition, said composition containing 10 to 100 parts by weight of carbon black having nitrogen-adsorbing specific surface area of 30 to 100 $m^2/g$ and dibutyl phthalate oil absorption of at least 50 ml/100 g, 5 to 120 parts by weight of a laminated natural mineral having an aspect ratio of 3 to 30 and average particle size of 2 to 30 μm, and at least 2 parts by weight of sulfur or a sulfur compound, based on 100 parts by weight of a diene rubber component.

4 Claims, No Drawings

SIDE-REINFORCING RUBBER COMPOSITION AND RUN FLAT TIRE USING THE SAME

BACKGROUND OF THE INVENTION

The present invention relates to a side-reinforcing rubber composition, which has excellent run flat performance, and a run flat tire using the same.

At present, a run flat tire having a side-reinforcing rubber of high hardness positioned on the inside of the sidewall has been realized and such a tire can run for a certain distance even when air pressure is lost due to puncture of the tire. As a result, a spare tire does not always need to be carried and the weight of the vehicle as a whole can be reduced. However, the speed and distance that can be run by a run flat tire when punctured is limited and further improvement in durability of a run flat tire is desired.

An example of an effective means to improve durability of a run flat tire is the method of suppressing deformation by thickening the reinforcing rubber, thereby preventing damage due to deformation. However, because the weight of the tire increases, this counters the initial purpose of a run flat tire, which is to become lightweight.

Another example of an effective means to improve durability of a run flat tire is the method of increasing the hardness of the reinforcing rubber by compounding an increased amount of a reinforcing filler such as carbon black, thereby suppressing deformation. However, improvement of run flat durability is not satisfactory, as the load to steps such as kneading and extruding is large and also, heat generating properties become high after vulcanization.

A further example of an effective means to improve durability of a run flat tire is the method of increasing vulcanization density, without increasing the amount of carbon black, by using a large amount of a vulcanizing agent and a vulcanization accelerator, thereby suppressing deformation and heat generation (for example, see JP-A-2002-155169). However, elongation of the rubber is small and strength at break decreases.

Also, improving air permeability resistance and appearance by compounding laminated natural minerals such as micas in rubber for the sidewall of a pneumatic tire has been suggested (for example, see JP-A-2003-292685 and JP-A-11-348513). However, because these rubbers require bending resistance, there is the problem that these rubbers have low hardness, which is insufficient for using as side-reinforcing rubber for a run flat tire and supporting load under low inner pressure conditions.

SUMMARY OF THE INVENTION

The present invention aims to provide a side-reinforcing rubber composition for a run flat tire, which achieves both low heat generating properties and high strength and improves run flat durability, and also a run flat tire using such a rubber composition.

The present invention relates to a side-reinforcing rubber composition for a run flat tire comprising 10 to 100 parts by weight of carbon black having nitrogen-adsorbing specific surface area of 30 to 100 m$^2$/g and dibutyl phthalate oil absorption of at least 50 ml/100 g, 5 to 120 parts by weight of a laminated natural mineral having aspect ratio of 3 to 30 and average particle size of 2 to 30 μm, and at least 2 parts by weight of sulfur or a sulfur compound, based on 100 parts by weight of a diene rubber component.

The laminated natural mineral is preferably a mica.

The mica is preferably at least one member selected from the group consisting of kaolinite, sericite, phlogopite and muscovite.

20 to 80% by weight of the diene rubber component is preferably butadiene rubber.

The rubber composition preferably further comprises 2 to 20 parts by weight of a silane coupling agent based on 100 parts by weight of the laminated natural mineral.

The side-reinforcing rubber composition preferably has a strength at break of at least 10 MPa and satisfies the following equation $$E''/(E^*)^2 \leq 7.0 \times 10^{-9} \text{Pa}^{-1}$$

(wherein E" represents loss modulus and E* represents complex modulus).

Also, the present invention relates to a run flat tire having a side-reinforcing rubber comprising the rubber composition.

DETAILED DESCRIPTION

The side-reinforcing rubber composition of the present invention comprises a diene rubber component, carbon black, a laminated natural mineral and sulfur or a sulfur compound.

Examples of the diene rubber component used in the present invention are natural rubber (NR), butadiene rubber (BR), syndiotactic 1,2-polybutadiene (1,2-BR), styrene-butadiene copolymer rubber (SBR), isoprene rubber (IR), acrylonitrile-butadiene copolymer rubber (NBR), chloroprene rubber (CR), styrene-isoprene-butadiene copolymer rubber (SIBR), styrene-isoprene copolymer rubber and isoprene-butadiene copolymer rubber. These can be used alone or two or more kinds can be used together.

The content of BR in the diene rubber component is preferably at least 20% by weight. When the content of BR is less than 20% by weight, heat generating properties tend to become high. Also, the content is at most 80% by weight, preferably at most 60% by weight. When the content of BR is more than 80% by weight, the rubber strength tends to decrease.

The nitrogen-adsorbing specific surface area (N$_2$SA) of the carbon black used in the present invention is at least 30 m$^2$/g, preferably at least 35 m$^2$/g. When N$_2$SA of the carbon black is less than 30 m$^2$/g, reinforcing properties are insufficient and sufficient durability cannot be obtained. Also, N$_2$SA of the carbon black is at most 100 m$^2$/g, preferably at most 80 m$^2$/g, more preferably at most 60 m$^2$/g. When N$_2$SA of the carbon black is more than 100 m$^2$/g, heat generating properties become high.

The dibutyl phthalate oil absorption (DBP oil absorption) of the carbon black is at least 50 ml/100 g, preferably at least 80 ml/100 g. When the DBP oil absorption is less than 50 ml/100 g, sufficient reinforcing properties are difficult to obtain.

The content of carbon black is at least 10 parts by weight, preferably at least 20 parts by weight, more preferably at least 30 parts by weight, based on 100 parts by weight of the diene rubber component. When the content of carbon black is less than 10 parts by weight, sufficient rubber strength cannot be obtained. Also, the content of carbon black is at most 100 parts by weight, preferably at most 70 parts by weight, more preferably at most 60 parts by weight. When the content of carbon black is more than 100 parts by weight, the viscosity of the compound increases and kneading and extruding the rubber becomes difficult.

As the laminated natural mineral used in the present invention, micas are particularly preferable.

As the mica, for example, kaolinite, sericite, phlogopite and muscovite are preferable and of these, from the viewpoint of balance in hardness and destruction strength, sericite is more preferable. These can be used alone or two or more kinds can be used together.

The aspect ratio (ratio of maximum diameter to thickness) of the laminated natural mineral is at least 3, preferably at least 5, more preferably at least 10. When the aspect ratio of the laminated natural mineral is less than 3, sufficient rubber hardness cannot be obtained. Also, the aspect ratio of the laminated natural mineral is at most 30, preferably at most 20. When the aspect ratio is larger than 30, dispersability of the laminated natural mineral in the rubber decreases and strength at break decreases. The aspect ratio is found by measuring the major axis and the minor axis of 50 random particles of the laminated natural mineral observed by an electron microscope and calculating a/b from the average major axis a and average minor axis b.

The average particle size of the laminated natural mineral is at least 2 μm, preferably at least 5 μm, more preferably at least 10 μm. When the average particle size is less than 2 μm, costs for pulverization are high and sufficient rubber hardness cannot be obtained. Also, the average particle size of the laminated natural mineral is at most 30 μm, preferably at most 20 μm. When the average particle size is more than 30 μm, the laminated natural mineral becomes a site for destruction and bending fatigue resistance decreases. The average particle size refers to the average value of the major axis of the laminated natural mineral.

The content of the laminated natural mineral is at least 5 parts by weight, preferably at least 10 parts by weight, particularly preferably at least 15 parts by weight, based on 100 parts by weight of the diene rubber component. When the content is less than 5 parts by weight, the effects of adding the laminated natural mineral cannot sufficiently be obtained. Also, the content of the laminated natural mineral is at most 120 parts by weight, preferably at most 80 parts by weight, particularly preferably at most 60 parts by weight. When the content is more than 120 parts by weight, dispersing the laminated natural mineral in the rubber becomes difficult and also, heat tends to be generated.

Furthermore, to the rubber composition of the present invention, a silane coupling agent is preferably added together with the laminated natural mineral.

Examples of the silane coupling agent are bis(3-triethoxysilylpropyl) tetrasulfide, bis(3-trimethoxysilylpropyl)tetrasulfide, bis(2-triethoxysilylpropyl)tetrasulfide, 3-mercaptopropyltriethoxysilane and 2-mercaptoethyltrimethoxysilane. These may be used alone or any combination thereof may be used.

The amount of the silane coupling agent is preferably at least 2 parts by weight, preferably at least 4 parts by weight, based on 100 parts by weight of the laminated natural mineral. When the amount is less than 2 parts by weight, the effect of adding the silane coupling agent cannot sufficiently be obtained. Also, the amount is at most 20 parts by weight, preferably at most 15 parts by weight, based on the laminated natural mineral. When the amount is more than 20 parts by weight, the effect of adding the silane coupling agent cannot sufficiently be obtained, although costs are high.

As the sulfur or sulfur compound used in the present invention, insoluble sulfur is preferable from the viewpoint of suppressing surface precipitation of the sulfur.

As the insoluble sulfur, sulfur having average molecular weight of at least 10000, particularly at least 100000, and at most 500000, particularly at most 300000, is preferably used. When the average molecular weight is less than 10000, decomposition at a low temperature tends to occur and the sulfur tends to precipitate from the surface. When the average molecular weight is more than 500000, dispersability in the rubber tends to decrease.

The amount of the sulfur or sulfur compound is at least 2 parts by weight, preferably at least 3 parts by weight, and at most 10 parts by weight, preferably at most 8 parts by weight. When the amount of the sulfur or sulfur compound is less than 2 parts by weight, sufficient hardness may not be obtained and when the amount is more than 10 parts by weight, storage stability of the unvulcanized rubber tends to be lost.

Furthermore, the side-reinforcing rubber composition of the present invention can contain zinc oxide, wax, stearic acid, oil, antioxidants and vulcanization accelerators that are usually used in rubber compositions, within the range that the effects of the present invention are not lost.

Various compounds can be used as the vulcanization accelerator, but particularly, sulfenamide accelerators are most frequently used as delayed vulcanization accelerators, for the reasons that scorching tends not to occur in the preparation process and vulcanization properties are excellent. Also, a rubber composition that is prepared using a sulfenamide accelerator has low heat generating properties to deformation caused by external forces and therefore, the effect regarding the most important object of the present invention, that is, to improve durability of a run flat tire, is large.

Examples of the sulfenamide accelerator are TBBS (N-tert-butyl-2-benzothiazolylsulfenamide), CBS (N-cyclohexyl-2-benzothiazolylsulfenamide) and DZ (N,N'-dicyclohexyl-2-benzothiazolylsulfenamide). As other vulcanization accelerators, MBT (mercaptobenzothiazol), MBTS (dibenzothiazyldisulfide) and DPG (diphenylguanidine) can be used.

As a property after vulcanization, the rubber composition of the present invention preferably has strength at break ($T_B$) of at least 10 MPa, more preferably at least 12 MPa, particularly preferably at least 14 MPa. When $T_B$ is less than 10 MPa, the tire is damaged when run under run flat conditions due to bending caused by load of the vehicle and run flat performance tends to be extremely insufficient.

Furthermore, loss modulus (E") and complex modulus (E*) of the rubber composition of the present invention preferably satisfy the following equation.

$$E''/(E^*)^2 \leq 7.0 \times 10^{-9} \text{ Pa}^{-1}$$

$E''/(E^*)^2$ is preferably at most $7.0 \times 10^{-9}$ Pa$^{-1}$, more preferably at most $6.0 \times 10^{-9}$ Pa$^{-1}$. When $E''/(E^*)^2$ is larger than $7.0 \times 10^{-9}$ Pa$^{-1}$, heat generation due to deformation when run under run flat conditions is large and heat aging of the rubber is promoted, leading to destruction of the tire.

The rubber composition of the present invention is used as a side-reinforcing rubber for a run flat tire. Herein, side-reinforcing rubber refers to the lining strip layer positioned on the inside of the sidewall of a run flat tire. When a side-reinforcing rubber is present in a run flat tire, the vehicle can be supported even when air pressure is lost and excellent run flat durability can be provided.

The present invention is explained in detail based on Examples below, but the present invention is not limited thereto.

The materials used in Examples and Comparative Examples are described below.

NR: RSS #3
BR: VCR 412 available from Ube Industries, Ltd.
Carbon black (FEF): DIABLACK E available from Mitsubishi Chemical Corporation ($N_2SA$: 41 $m^2$/g, DBP oil absorption: 115 ml/100 g)
Sericite: KM-8 (aspect ratio: 15, average particle size: 17 μm) available from Nippon Forum Co., Ltd.
Stearic acid: Tsubaki available from NOF Corporation
Zinc oxide: Zinc oxide type 2 available from Mitsui Mining and Smelting Co., Ltd.
Antioxidant: Antigen 6C available from Sumitomo Chemical Co., Ltd.
Silane coupling agent: Si-75 available from Degussa Hules Co.
Insoluble sulfur: Mu-cron OT available from Shikoku Corp.
Vulcanization accelerator: Nocceler NS (N-tert-butyl-2-benzothiazolylsufenamide) available from Ouchi Shinko Chemical Industrial Co., Ltd.

EXAMPLES 1 AND 2 AND COMPARATIVE EXAMPLES 1 TO 4

According to the compositions shown in Table 1, the components other than insoluble sulfur and the vulcanization accelerator were kneaded at 150° C. for 4 minutes. The insoluble sulfur and the vulcanization accelerator were added to the obtained kneaded rubber and kneaded for 3 minutes at 80° C. to obtain the rubber composition.

A 215/45ZR1 7 size run flat tire was prepared, in which a lining strip layer comprising the rubber compositions of Examples and Comparative Examples was positioned inside the sidewall as the reinforcing rubber and the following evaluations were conducted. The evaluation results are shown in Table 1.

<$T_B$ (Strength at Break)>

A sheet of 2 mm thickness was cut out from the lining strip layer of the tire and $T_B$ (MPa) was evaluated according to JIS K6251.

<$E''/(E^*)^2$>

E" (loss modulus) and E* (complex modulus) were measured using a viscoelasticity spectrometer made by Iwamoto Corporation under the conditions of temperature of 70° C., initial strain of 10%, dynamic strain of ±1% and frequency of 10 Hz and $E''/(E^*)^2$ was calculated.

<Run Flat Performance>

The tire having inner air pressure of 0 kPa was run on a drum at a speed of 80 km/h and the distance run until the tire was broken was compared. Evaluation was conducted based on Comparative Example 1 as 100 and the results of each tire was represented as an index. The larger the number value, the better the run flat durability.

TABLE 1

|  | Ex. |  | Com. Ex. |  |  |  |
| --- | --- | --- | --- | --- | --- | --- |
|  | 1 | 2 | 1 | 2 | 3 | 4 |
| Composition (parts by weight) |
| NR | 70 | 70 | 70 | 70 | 70 | 70 |
| BR | 30 | 30 | 30 | 30 | 30 | 30 |
| Carbon black | 50 | 50 | 65 | 5 | 62 | 50 |
| Sericite | 30 | 15 | — | 75 | 3 | 30 |
| Stearic acid | 2 | 2 | 2 | 2 | 2 | 2 |
| Zinc oxide | 3 | 3 | 3 | 3 | 3 | 3 |
| Antioxidant | 1 | 1 | 1 | 1 | 1 | 1 |
| Silane coupling agent | 3 | 3 | — | — | 0.4 | 3 |
| Insoluble sulfur | 5 | 5 | 5 | 5 | 5 | 1.8 |
| Vulcanization accelerator | 2 | 2 | 2 | 2 | 2 | 1.4 |
| Evaluation results |
| $T_B$ (MPa) | 15.2 | 14.7 | 14.4 | 8.1 | 13.9 | 14.9 |
| $E''/(E^*)^2$ ($\times 10^{-9}$ $Pa^{-1}$) | 4.3 | 5.5 | 7.8 | 4.2 | 7.6 | 8.9 |
| Run flat performance | 208 | 166 | 100 | 41 | 100 | 68 |

According to the present invention, by compounding carbon black, a laminated natural mineral and sulfur or a sulfur compound in a rubber composition, both low heat generating properties and high hardness can be achieved in the obtained rubber composition. Also, by using the rubber composition as a side-reinforcing rubber for a run flat tire, run flat durability can be improved.

What is claimed is:

1. A run flat tire having a sidewall which contains a side-reinforcing rubber composition comprising
a diene rubber component,
10 to 100 parts by weight of carbon black having a nitrogen-adsorbing specific surface area of 30 to 100 $m^2$/g and a dibutyl phthalate oil absorption of at least 50 ml/100 g, 5 to 120 parts by weight of sericite having an aspect ratio of 3 to 30 and an average particle size of 2 to 30 mm, and at least 2 parts by weight of sulfur or a sulfur compound, based on 100 parts by weight of the diene rubber component.

2. The run flat tire of claim 1, wherein 20 to 80% by weight of said diene rubber component is butadiene rubber.

3. The run flat tire of claim 1, which further comprises 2 to 20 parts by weight of a silane coupling agent based on 100 parts by weight of said laminated natural mineral.

4. The run flat tire of claim 1, wherein the side-reinforcing rubber composition has a strength at break of at least 10 MPa and satisfies the following equation:

$$E''/(E^*)^2 \leq 7.0 \times 10^{-9} Pa^{-1}$$

(wherein E" represents the loss modulus and E* represents the complex modulus).

* * * * *